United States Patent [19]
Eaton et al.

[11] Patent Number: 5,546,394
[45] Date of Patent: Aug. 13, 1996

[54] MESSAGE FRAGMENTING IN A TIME DIVERSITY RADIO SYSTEM

[75] Inventors: Eric T. Eaton, Lake Worth; Ronald H. Evoy, West Palm Beach; David J. Hayes, Lake Worth; David F. Willard, Plantation, all of Fla.; Shogo Ito; Yasushi Yamao, both of Kanagawa-ken, Japan

[73] Assignee: Motorola, Inc., Schaumburg, Ill.

[21] Appl. No.: 352,647

[22] Filed: Dec. 9, 1994

[51] Int. Cl.⁶ .................................................. H04Q 7/08
[52] U.S. Cl. ...................... 370/79; 370/95.1; 340/825.44
[58] Field of Search ................................. 370/79, 80, 82, 370/84, 95.1, 95.3, 99, 102, 111, 110.1; 340/825.03, 825.04, 825.44; 455/38.1, 38.2, 38.31

[56] References Cited

U.S. PATENT DOCUMENTS

| | | | |
|---|---|---|---|
| 5,020,056 | 5/1991 | Chennakeshu | 370/95.1 X |
| 5,153,878 | 10/1992 | Krebs | 370/95.1 |
| 5,168,271 | 12/1992 | Hoff | 370/82 X |
| 5,345,600 | 9/1994 | Davidson | 455/50.1 |
| 5,446,759 | 8/1995 | Campana, Jr. | 375/347 X |

FOREIGN PATENT DOCUMENTS

WO94/17607   8/1994   Japan .

*Primary Examiner*—Melvin Marcelo
*Attorney, Agent, or Firm*—D. Andrew Floam

[57] ABSTRACT

A time diversity communication system (150) comprises a messaging terminal (154), a queue (156) at the messaging terminal for queuing incoming messages, an encoder (158) for encoding a first fragment of a message and the remaining fragments of a message, a transmitter (160) for repeatedly transmitting the first fragment in a plurality of time slots to at least one selective call receiver (201) operating in a first mode, the number of time slots equaling a desired number of repeat transmissions and wherein the first fragment contains instructions for decoding the remaining fragments in a second mode by the selective call receiver, the transmitter (160) also repeatedly transmits the remaining portions of the message in subsequent time slots and at least one selective call receiver that decodes the first fragment and remaining fragments of the message in accordance with instructions in the decoded first fragment.

25 Claims, 4 Drawing Sheets

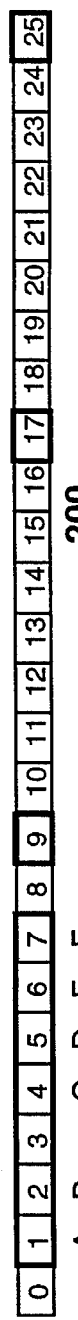
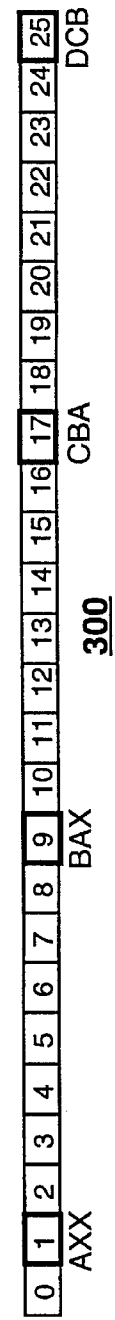
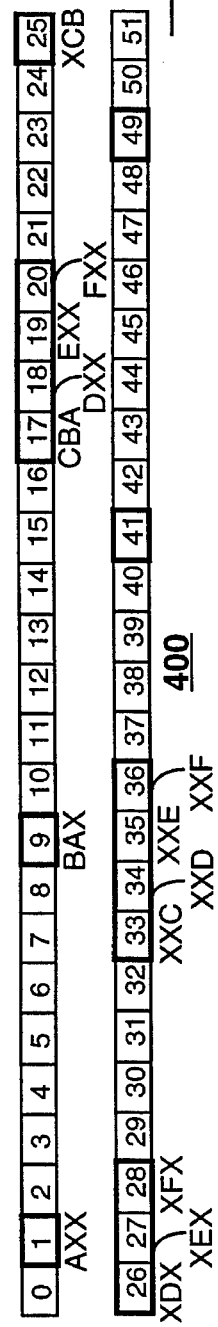
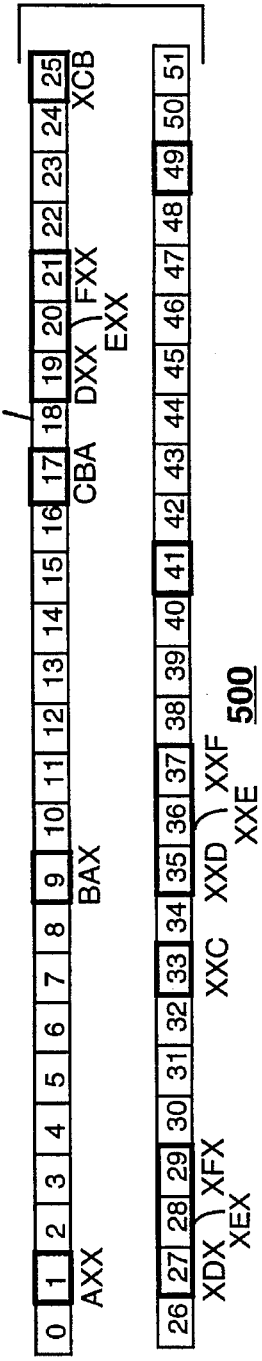

MESSAGE FRAGMENTING IN A TIME DIVERSITY RADIO SYSTEM

FIELD OF THE INVENTION

This invention relates generally to a time diversity radio system, and more particularly to methods and apparatus for encoding and decoding long messages segmented into fragments in a time diversity radio system.

BACKGROUND OF THE INVENTION

In Japan, most paging systems transmit pages more than once to improve paging performance. In general, the multiple transmissions of a message are spaced significantly apart in time. Since a pager on a repeat system is given multiple opportunities to receive the same message in potentially different RF environments (due to the variance of field strength over time and the time difference of transmissions), the pager will gain paging sensitivity. This concept is generally known as time-diversity. Depending on a selective call receiver's (or pager's) knowledge of the timing of a message's repeats, the pager can "build" a message. Messages can be "built" at various levels within a messaging protocol structure or scheme, including at the page level, at the codeword level, or at the bit level. If a pager knows the timing (128 frames per cycle in Motorola's FLEX™ high speed paging protocol) in which it expects the repeats of a page, it can "build" the message at the page level by selecting the best message of all the repeats it receives. Sequential lockout is used to eliminate multiple alerts for the same message when a preceding message in a time diversity system is received error free. For instance, a pager in a POCSAG system where the message is repeated three times would ignore the second and third repeats if the message was decoded error free on the first repeat or ignore just the third repeat if the message was decoded on the second repeat.

If a pager knows the time frame in which it expects the repeats of a page and can be guaranteed that pages received during that time frame are repeats, it can "build" the message at the codeword level by combining the best message codewords of all the repeats it receives. This type of "building" is referred to as message codeword combining (MCWC) and is currently used in the NTT 1200 signaling scheme in Japan. Finally, if a pager knows the exact time it expects the repeat of a page, it can "build" the page at the codeword level by combining the best of all codewords of all the repeats. Alternatively, the pager could "build" the page at the bit level by combining the best bits of all the codewords (including address and/or vectors) of all the repeats. These two types of "building" are currently supported by FLEX™-TD, the version of FLEX™ used in Japan. They are referred to as codeword combining (CWC) and bit combining (BC).

In any time diversity system, there is typically a latency involved in transmitting, receiving and decoding an entire message because of the nature of the repeated messages. When a message is sent that is longer than a predetermined size (in the case of FLEX™, longer than a frame, for instance), then the time diversity system must further accommodate and account for the sectioning of the message into fragments. Thus, fragmenting of messages causes further latency in a time diversity system. The examples in FIGS. 2 and 3 are illustrative of the latency problems in both non-Time Diversity and Time-Diversity systems respectively.

Initiating and terminating message fragments in a time diversity system is also a problem where, as in FIG. 1, a long message 100 is sectioned into six different fragments, A, B, C, D, E and F. In the case where the message consists of displayable characters and each character is represented by a fixed number of bits, it is desirable to display each fragment independently. In the case where the number of bits used to represent each character is a submultiple of the number of information bits used by each "over the air" code word, the character positions within each code word is constant and the contents of a fragment may be displayed. In cases where the fragments are of fixed length it is possible to determine character positions by knowing the fragment number or by knowing the character position prior to missed fragments and by knowing the number of fragments missed. When the number of bits used to represent a character does not divide evenly into the number of information bits per code word and the fragment size is chosen dynamically to fit channel capacity criteria, the character boundaries will precess through code words. When a fragment is missed, the character positions in all following fragments can not be determined (in the general case) and the remaining message fragments can not be displayed.

Consider the message in the vicinity of a fragment boundary to be represented by 8 bit characters as shown below:

. . ., 12345678, 12345678, 12345678, 12345678, 12345678
, 12345678, 12345678, . . .

If the message above were split into two fragments using (31,21) BCH code plus even parity formatting as defined for FLEX and POCSAG into fragments N and N+1, then fragment N would appear as:

. . ., 12345678, 1
2345678, 12345678, 123456 and fragment N+1 would appear as:

78, 12345678, 12345678, 123
45678, 12345678, 123 . . .

Thus, in this example, when a fragment is missed in decoding, the character positions in all following fragments can not be determined (in the general case) and the remaining message fragments can not be displayed. Therefore, there is a need for initiating and terminating message fragments in a time diversity system in a form that would allow a pager to decode the remaining fragments where a prior fragment is missed.

BRIEF DESCRIPTION OF THE DRAWINGS

FIG. 1 is a block diagram of a fragmented message in accordance with the present invention.

FIG. 2 is a block diagram of a portion of a FLEX™ cycle showing receipt of a fragmented message in a non-time diversity system.

FIG. 3 is a block diagram of a portion of a FLEX™-TD cycle showing receipt of a fragmented message in a time diversity system.

FIG. 4 is a block diagram of a portion of a FLEX™-TD cycle showing receipt of a fragmented message in a time diversity system in accordance with the present invention.

FIG. 5 is another block diagram of a portion of a FLEX™-TD cycle showing receipt of a fragmented message in a time diversity system in an alternative embodiment in accordance with the present invention.

DETAILED DESCRIPTION OF THE PREFERRED EMBODIMENT

Figure 6:
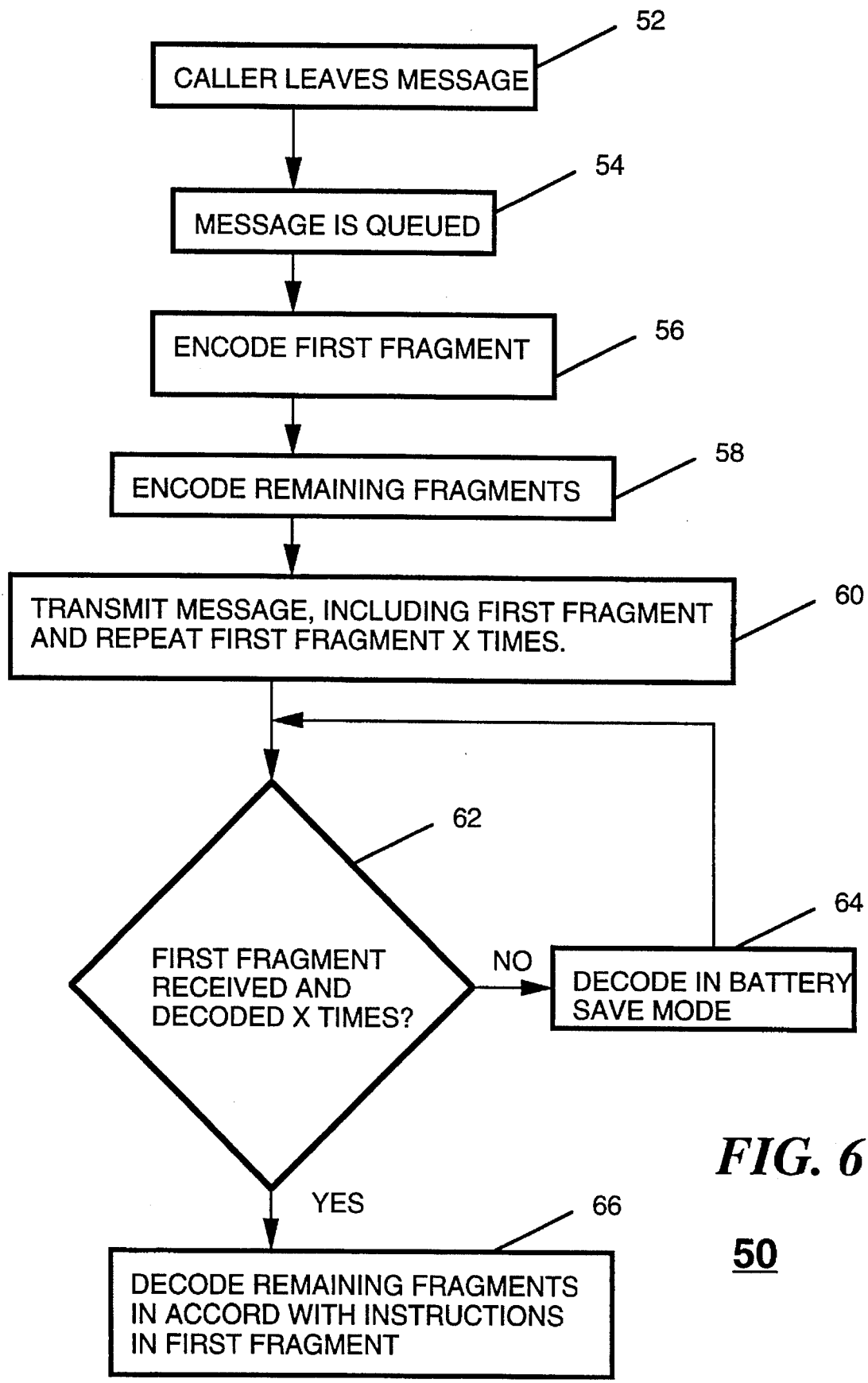
FIG. 6 is a flow chart showing a method of message fragmenting in accordance with the present invention.

Referring to FIG. 1, a long message 100 is sectioned into six different fragments, A, B, C, D, E and F. In an existing FLEX™ system that does not use time diversity (no repeats), a pager could be programmed to receive every eighth frame (starting with Frame #1) as shown in the portion 200 of a FLEX™ cycle in FIG. 2. Thus, a pager decoding Frame #1 would know (by means of a flag, pointer or otherwise) that the remaining portions (B, C, D, E and F) of the long message 100 would preferably be received in the next available succeeding frames or (time slots). In this instance, fragment A was received in frame #1, fragment B in frame #2, fragment C in frame #4, fragment D in frame #5, fragment E in frame #6, and fragment F in frame #7. Frame #3 was not available in this instance since it was filled with traffic (messages) for another selective call receiver or pager.

Repeating fragments of messages in a time diversity system becomes more complicated and wrought with latency as illustrated in FIG. 3, particularly when the message is longer than a predetermined time slot of frame. The portion 300 of a new FLEX™ Time Diversity Cycle assumes again that a pager is programmed to receive every eighth frame (starting with Frame #1 ), and in particular, repeated messages are received every eighth frame in a 3 repeat system. Another assumption is that any three fragments would fit in a frame. Thus, the fragments are cycled or rotated through on each assigned receive frame. For instance, in frame 1, message fragment A is received, in frame 9, message fragments B and A are received, in frame 17, message fragments C, B, and A are received, in frame 25, message fragments DCB are received, in frame 33 (not shown), message fragments EDC are received, in frame 41 (not shown), message fragments FED are received, in frame 49 (not shown), message fragments X and F are received, and in frame 57 (not shown), message fragment F is received. This scheme results in a worst case delivery time of approximately (7 repeats times 8 frames per repeat times 1.875 seconds per frame) 105 seconds.

The present invention alleviates the serious latency problem associated with fragmented messages in a repeat system or time-diversity system while enabling the system to fully repeat all the fragments of the message as required in a time-diversity system. A message or a portion of a message is repeated in a predetermined number of time slots where each time slot has a predetermined number of sub-time slots containing the message or portion thereof, and the sub-time slots are shifted in their sequence each time they are transmitted. Referring to FIG. 4, the fragments are cycled or rotated through on each assigned receive frame as shown in FIG. 3, up to frame #17. The portion 400 of this FLEX™ Time Diversity Cycle assumes again that a pager is programmed to receive every eighth frame (starting with Frame #1 ), and in particular, repeated messages are received every eighth frame in a 2 repeat system (same message transmitted 3 times overall). But after receipt of frame #17, note a pager would have been given the full opportunity to receive the first fragment "A" after being repeated (3 times) in frames 1,9 and 17. Thus, the pager could alter its receive mode to increase the frequency of active frames to receive in succeeding frames after frame #17. Preferably, the remaining portions of the message are repeatedly transmitted in subsequent consecutive time slots after and including each of the pager's normally active time slots (Frame #17, 25, and 33) the desired number of times.

By transmitting various pieces of information over the air, a FLEX™-TD paging system can change the frame(s) in which a pager on the system expects to receive information. Examples of such scenarios in the FLEX™-TD air interface protocol include changing of the system collapse value, message fragmentation by way of the "Continue" flag, and setting up a Dynamic Group Call with a short instruction vector. The pager would then have the opportunity to receive the remaining portions of the message in succeeding frames #18 through #20. The pager would also be given the opportunity to receive the repeats of the fragments in frames #25–#28 and/or frames #33–36. The present invention as illustrated by FIG. 4 thereby accommodates for the required number of repetitions while drastically reducing the latency involved in receiving and decoding a fragmented message. In this case, the latency can be approximately calculated as follows: 36 frames times 1.875 seconds per frame equals 67.5 seconds.

Referring to FIG. 5, a slight variation is shown to the invention of FIG. 4, wherein the inventions allows one additional frame after receiving the last repeat of the first fragment "A". This gives the pager additional set-up time in preparation for the change in reception mode. This is particularly useful in cases where the microprocessor used in the pager does not have enough processing "horsepower" to prepare for the upcoming reception mode change in such a short time span. In this instance, the portion 500 of the FLEX™ time-diversity cycle includes a Frame #18 (and Frame #s 26, 34, 42, 50, etc.) that is pre-set not to allow the carrying of fragments, thereby providing the additional frame time to allow the pager to prepare for the reception mode change as previously discussed. In this instance, the pager would then have the opportunity to receive the remaining portions of the message in succeeding frames #19 through #21. The pager would also be given the opportunity to receive the repeats of the fragments in frames #25 and #27–#29 and/or frames #33 and #35–37 as shown. It should be noted that FIG. 4 and FIG. 5 shown the worst case delivery in terms of time and battery saving capabilities when the pager must receive and decode each fragment three (3) times in accordance with the first fragment instructions or the cycle portions 400 and 500 respectively. It should be further noted, that this example specifically shows a 3 transmission system (2 repeats), but claimed invention equally applies to a 2 or a 4 or other multiple transmission system.

By relying on multiple transmissions to increase paging sensitivity, a FLEX™-TD paging system must allow for the worst case timing for reception of configuration information before assuming the pager has re-configured itself to look for information in a newly assigned frame(s). This worst case timing in FLEX™-TD is the time it takes to send all the transmissions of a piece of information.

Therefore, a FLEX™-TD paging system must send all the repeats of a new system collapse value before beginning to send information according to the new value. Thus, if a pager needs all of the transmissions of the system collapse value before the pager "builds" the collapse value properly, the pager will not miss any information which may have been transmitted according to the new system collapse cycle. For message fragmentation, a FLEX™-TD pager doesn't know to look for fragments in subsequent frames until it receives the "Continue" flag in the first message fragment. Since a pager may require all of the transmissions of the "Continue" flag to "build" it correctly, a FLEX™-TD paging system must finish sending all transmissions of the first message fragment before sending subsequent message fragments. In this way, the pager will not miss the latter fragments. Lastly, a FLEX™-TD paging system must send all transmissions of a shod instruction vector which instructs a pager is look in a different frame for a dynamic group address before it can send the dynamic group page. In this way, the pager will be given an opportunity to "build" the shod instruction vector and not miss the dynamic group call.

In more general terms, given a simplex (uni-directional) communication channel in which 1) the receiver expects information in time slots which are determined by configuration information sent by the sender through the channel, 2) the sender can dynamically alter the configuration information to reconfigure the receiver to expect information in different time slots, and 3) multiple transmissions are utilized to increase the probability of correct information reception, the sender must allow for the worst case latency for information reception before assuming that configuration information has been acted on by the receiver.

Referring to FIG. 6, a flow chart 50 shows a method of message fragmenting in accordance with the present invention. In step 52, a caller initially will leave a message at a base station, typically using a voice mail system with prompting messages. Next, the message is queued in step 54. The first fragment and the remaining fragments are encoded in steps 56 and 58 respectively. The message, including the first fragment is then transmitted repeatedly in step 60. The number of times that the first fragment is repeated is a predefined number of times. The more times the message is repeated, the greater assurance that the message will be received error free, but typically at the cost of capacity to the system. In step 62, the selective call receiver needs to determine whether the first fragment has been received and decoded, if necessary, the predetermined number of times. If not, then the selective call receiver continues to decode the messages in a battery save mode in step 64. If the first fragment has been received and decoded, if necessary, the predetermined number of times, then the selective call receiver decodes the remaining fragments in accordance with the instructions decoded in the first fragment in step 66. One should keep in mind that the pager can receive and decode the message for the first time error free and not need to decode subsequent repeat transmissions.

Figure 7:
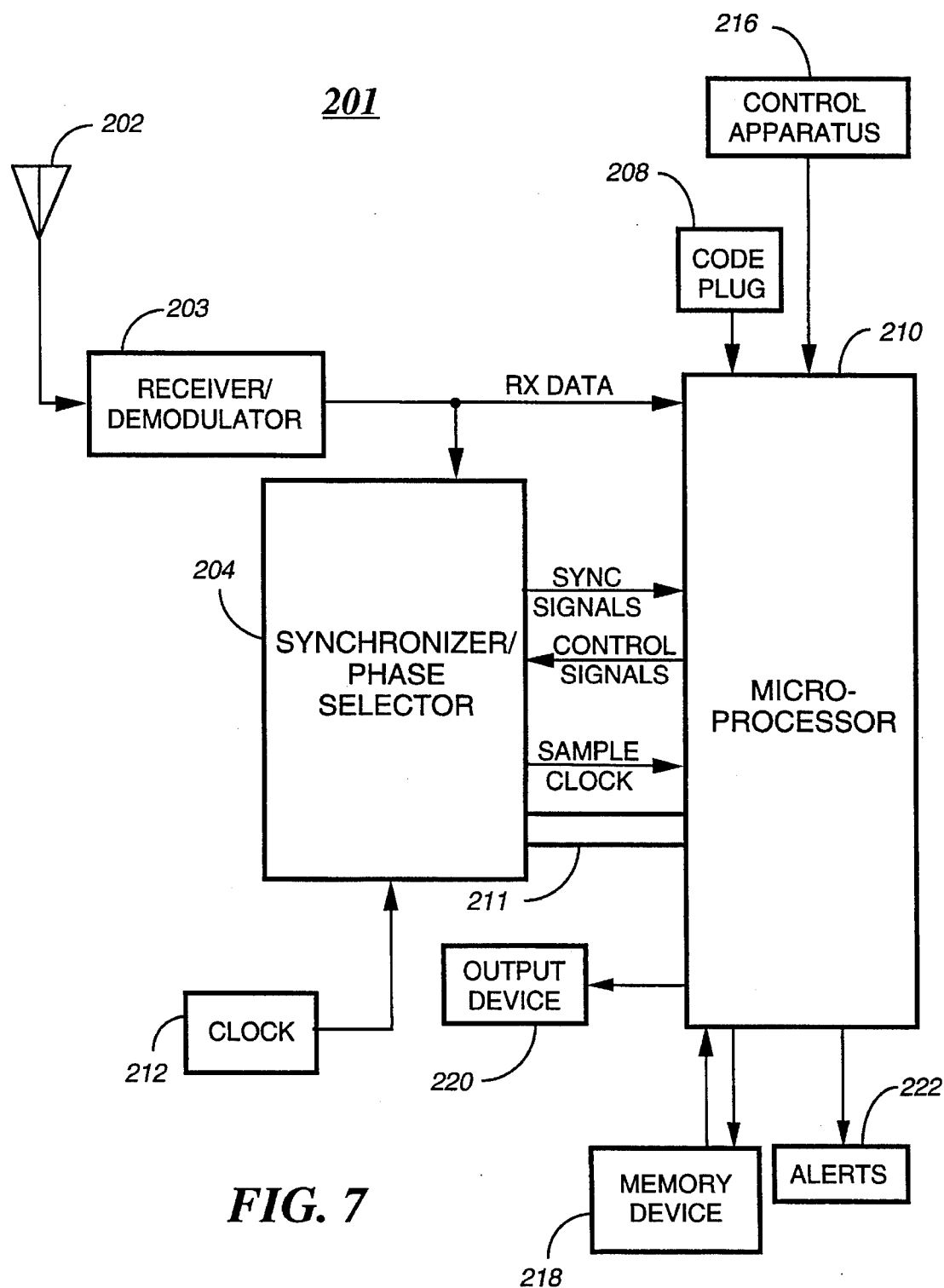
FIG. 7 is an electrical block diagram of a selective call receiver in accordance with the present invention.

Referring next to FIG. 7, in a selective call receiver 201 according to the present invention, an antenna 202 receives an RF signal modulated with selective call address and message information. The signal is demodulated by receiver/demodulator circuitry or receiver module 203 capable of receiving the first fragment on preassigned time slot(s). The demodulated signal is provided to a synchronizer/phase selector 204 and a microprocessor 210. The microprocessor 210 controls the operation of the synchronizer/phase selector 204 with control signals and control information provided on a bus 211. The microprocessor 210 serves as the decoder module for decoding the first fragment and for decoding the remaining fragments in accordance with instructions found in the first fragment. The microprocessor 210 preferably serves as the decoder individually, but can alternatively serve as the decoder in combination with the memory device 218 and/or code plug 208. Synchronization operations performed by the synchronizer/phase selector 204 are synchronized to a clock 212. The control information provided on a bus 211 is derived in part from predetermined information stored in a code plug 208. The code plug 208 is a nonvolatile memory for storing option and control information such as the selective call receiver addresses. In the preferred embodiment, the predetermined information is contained in the three least significant bits of the selective call address stored in the code plug 208. The predetermined information may, alternatively, be assigned independently of the address by using extra bits in the code plug 208.

The microprocessor 210 reconstructs and decodes the individual code words in accordance with the methods claimed and described herein, the decoding being facilitated by synchronization signals (SYNC SIGNALS) and a sample clock provided from the synchronizer/phase selector 204. A control apparatus 216 for the microprocessor 210 comprises user selectable controls such as an ON/OFF control, a selective call message select control, and a selective call message recall control. The decoded message signals may be provided to an output device 220 or to a memory device 218 for storage and later output. The microprocessor 210 also activates alerts 222 in a manner well known to those skilled in the art. In other words, the microprocessor 210 preferably serves as a controller for controlling the decoder module, a sensory alert device, and a display device all coupled to the controller. For a more detailed description of the structure and operation of a selective call receiver of the type shown in FIG. 7, reference is made to U.S. Pat. Nos. 4,518,961, U.S. Pat. No. 4,649,538, and U.S. Pat. No. 4,755,816, all commonly assigned to the same assignee as the present invention, and the teachings of which are hereby incorporated by reference.

Figure 8:
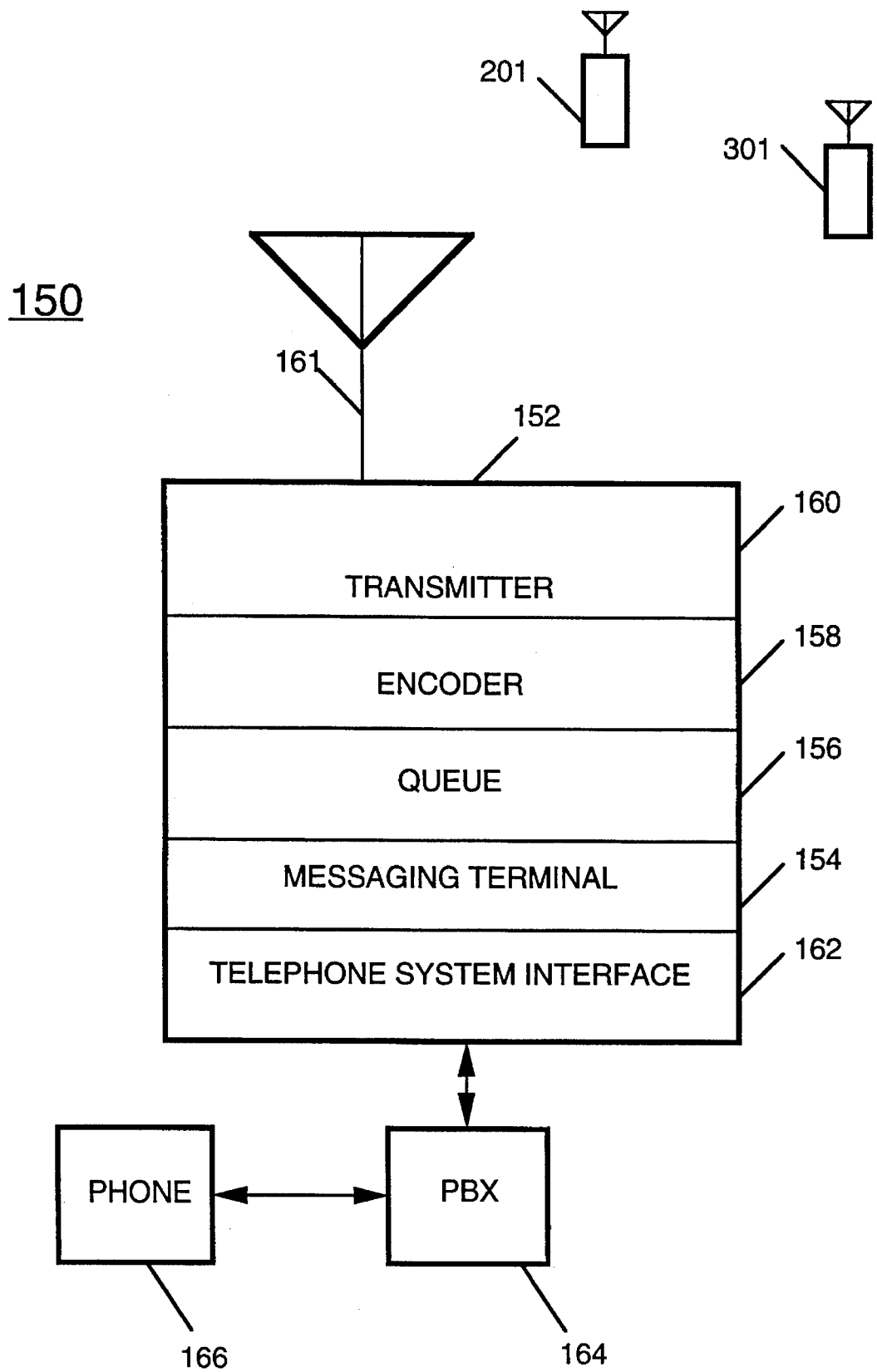
FIG. 8 is an block diagram of a time diversity communication system in accordance with the present invention.

Referring to FIG. 8, a time diversity communication system 150 preferably comprises a base station 152 having a messaging terminal 154 where messages are received from a caller via a telephone 166 and telephone exchange system (PBX) 164 as is known in the art. The base station 152 would also preferably include a telephone system interface 162. As the messages are called in, the messages are placed in a queue 156 in the base station's memory. An encoder 158 encodes a first fragment of a message and the remaining fragments of the message. A transmitter 160 having an antenna 161 repeatedly transmits the first fragment in a plurality of time slots to at least one (201) of a plurality (201 and 301) of selective call receivers operating in a first mode, wherein the number of time slots equals the desired number of repeat transmissions. The first fragment contains instructions for decoding the remaining fragments in a second mode by the one of a plurality of selective call receivers. The transmitter further repeatedly transmits the remaining fragments of the message in subsequent time slots. The selective call receiver (201 or 301) decodes the first fragment and the remaining fragments of the message in accordance with the instructions in the first fragment after the selective call receiver decodes the first fragment repeatedly (if necessary) in the desired number of repeat transmissions.

In another aspect of the present invention, a method for initiating and terminating fragmented messages in a time diversity system is used to allow a decoder (preferably in a selective call receiver) to keep track of character positions in following fragments when a previous fragment is missed.

Thus, consider the message in the vicinity of a fragment boundary to be represented again by 8 bit characters (where each bit is typically either a "0" or a "1") as shown below:

..., 12345678, 12345678, 12345678, 12345678, 12345678, 12345678, 12345678, 12345678, ...

These messages are placed within (for this example) a 21 bit "message word", wherein a dynamically determined number of "message words" fit within a fragment.

If the message above were split into two fragments using the method of the present invention into fragments N and N+1, then fragment N would appear as:

| Word 1: | ..., 12345678, 1 |
| Word 2: | 2345678, 12345678, xxxxxx | and fragment N+1 would appear as

| Word 1: | 12345678, 12345678, 12345 |
| Word 2: | 678, 12345678, 12345678, 12 |
| Word 3: | 3, xxxxxxxxxxxxxxxxxx |

Where "x" would be either a "0" or a "1" in accordance with the rule described below.

Wherein, the method of the present invention requires that the frame begin with a complete character of predetermined number of bits (in this case 8) and terminate the end of the fragment or the boundary of the fragment with default bits that complete the remainder of the fragment (or frame as the case may be) as shown at the end of fragment N above.

Unused bits in the end boundary of a fragment in the present invention would either be filled with all 0's or all 1's depending on the last valid data bit. The choice of all 0's or 1's is selected on the basis of determining the opposite polarity or value of the last valid data or character bit. For the final fragment of a message, at least one opposite polarity terminating bit or default bit must be sent. In other words, if a message exactly ends on the last bit of a fragment boundary, an additional message word needs to be sent having all 1's or all 0's to signify the position of the last character. Thus, the last character can be all 1s or 0's within a message word without creating confusion in the message fragmenting time diversity system.

In another alternative embodiment of the aspect of initiating and terminating fragments, the use of default bits can be avoided by taking advantage of a control bit or control field within the message word. In accordance with this embodiment, if the message similar to the previous example were split into two fragments N and N+1, the fragment N would appear as:

| YYYY78, 12345678, 123456 |
| 78, 12345678, 12345678, 123 |

Where YYYYY is the control field or bits for indicating where a first character starts in the fragment (in this case YYYYY=8 or (01000 in Binary) indicating that the first full character starts in bit position 8);

and fragment N+1 would appear as:

| YYYYY45678, 12345678, 123 |
| 45678, 12345678, 12345678 |

In Fragment N+1, YYYYY=11 or (01011 in binary) indicating that the first full character in this fragment starts in bit position 11.

Thus, this method of parsing a message into fragments in a time diversity system requires the steps of defining a number of bits per character in a message within a fragment, filling the fragment with complete characters and partial characters within a predefined size of a message word within the fragment, determining the number of partial character bits at the end of a fragment to find a first character boundary in a subsequent fragment, and creating a control field to indicate the character boundary in the subsequent fragment.

In this example, when a portion of a fragment is missed in receiving or decoding, the character positions in all following fragments can be determined and the remaining message fragments can subsequently be displayed since the control field or control bits allows the pager to determine the character boundary in subsequent fragments. Here, the YYYYY would indicate that either the last character in the first fragment has 3 bits or that the remaining portion of the character in the following fragment will have five bits (plus the predetermined 5 bit YYYYY field), thus the pager will "know" that the next character boundary in the "N+1" fragment starts on the 11th bit.

It should be understood that the methods of parsing the messages described above can be equally applicable in non-Time-Diversity systems and is contemplated by the present invention. The present invention has been described in detail in connection with the disclosed embodiments, but these embodiments, however, are merely examples and the invention is not restricted thereto. It will be understood by those skilled in the art that variations and modifications can be made within the scope and spirit of the present invention as defined by the appended claims.

What is claimed is:

1. In a time diversity paging system, having at least one transmitter and at least one of a plurality of selective call receivers operating in a first mode where each of the plurality of selective call receivers actively decode on pre-assigned time slots, a method for encoding and transmitting at a base station a message longer than a predetermined time slot, comprising the steps of:

receiving the message from a caller at the base station;

queuing the message;

encoding a first fragment of the message and remaining fragments of the message;

repeatedly transmitting the first fragment in a plurality of time slots, the number of time slots equaling a desired number of repeat transmissions and wherein the first fragment contains instructions for decoding the remaining fragments in a second mode by at least one of the plurality of selective call receivers; and repeatedly transmitting remaining portions of the message in subsequent time slots, wherein the at least one of a plurality of selective call receivers decodes the remaining portions of the message in accordance with instructions in the first fragment.

2. The method of encoding and transmitting of claim 1, wherein the first mode is a battery save mode for at least one of the plurality of selective call receivers.

3. The method of encoding and transmitting of claim 1, wherein remaining portions of the message are repeatedly transmitted in subsequent consecutive time slots.

4. The method of encoding and transmitting of claim 1, wherein the first fragment and remaining portions of the message are transmitted up to four times to the at least one of the plurality of selective call receivers.

5. In a time diversity paging system, having at least one transmitter and at least one of a plurality of selective call receivers operating in a first mode requiring each of the plurality of selective call receivers to actively decode on preassigned time slots, a method for decoding a message longer than a predetermined time slot and separated into fragments, comprising the steps at one of the plurality of selective call receivers of:

operating in a first mode to decode at least a first fragment of the message which is repeatedly transmitted within preassigned time slots, the number of the time slots equaling a desired number of repeat transmissions and wherein the first fragment contains instructions for decoding remaining fragments in a second mode at the one of the plurality of selective call receivers; and repeatedly decoding the remaining portions of the message in subsequent time slots, wherein the one of the plurality of selective call receivers decodes the remaining portions of the message in accordance with the instructions in the first fragment.

6. The method of decoding of claim 5, wherein the first mode is a battery save mode for the at least one of the plurality of selective call receivers.

7. The method of decoding of claim 5, wherein remaining portions of the message are repeatedly transmitted in subsequent consecutive time slots.

8. The method of decoding of claim 5, wherein the first fragment and the remaining portions of the message are received up to four times by at least one of the plurality of selective call receivers.

9. In a time diversity system, a selective call receiver capable of receiving messages longer than a predetermined time slot and sectioned into at least a first fragment and remaining fragments, the selective call receiver operating in a first mode requiring the selective call receiver to actively decode the first fragment repeatedly on preassigned time slots and operating in a second mode requiring the selective call receiver to actively decode the remaining fragments in accordance with instructions within the first fragment, comprising:

a receiver module capable of receiving the first fragment on preassigned time slots;

a decoder module coupled to the receiver module for decoding the first fragment and for decoding the remaining fragments in accordance with instructions within the first fragment; and a controller for controlling the decoder module, a sensory alert device, and a display device all coupled to the controller.

10. The selective call receiver of claim 9, wherein a message or a portion of a message is repeated in a predetermined number of time slots where each time slot has a predetermined number of sub-time slots containing the message or portion thereof, and the sub-time slots are shifted in their sequence each time they are transmitted.

11. The selective call receiver of claim 9, wherein the first mode is a battery save mode for the selective call receiver.

12. The selective call receiver of claim 9, wherein the remaining portions of the message are repeatedly received and decoded in subsequent consecutive time slots.

13. The selective call receiver of claim 9, wherein the first fragment and the remaining fragments of the message are received up to four times by the selective call receiver.

14. A time diversity communication system, comprising:

a messaging terminal where messages are received from a caller;

a queue at the messaging terminal for queuing incoming messages;

an encoder for encoding a first fragment of a message and remaining fragments of a message;

a transmitter for repeatedly transmitting the first fragment in a plurality of time slots to at least one of a plurality of selective call receivers operating in a first mode, the number of time slots equaling a desired number of repeat transmissions and wherein the first fragment contains instructions for decoding remaining fragments in a second mode by the at least one of a plurality of selective call receivers, and the transmitter for repeatedly transmitting the remaining fragments of the message in subsequent time slots; and at least one of a plurality of selective call receivers that decodes the first fragment and remaining fragments of the message in accordance with instructions in the first fragment after the selective call receiver decodes the first fragment repeatedly in the desired number of repeat transmissions.

15. The time diversity communication system of claim 14, wherein a message or a fragment of a message is repeated in a predetermined number of time slots where each time slot has a predetermined number of sub-time slots containing the message or portion thereof, and the fragments are shifted in their sequence through the sub-time slots each time they are transmitted.

16. The time diversity communication system of claim 14, wherein the first mode is a battery save mode for the selective call receiver.

17. The time diversity communication system of claim 14, wherein the remaining fragments of the message are repeatedly received and decoded in subsequent consecutive time slots after and including each of the selective call receiver's normally active time slots.

18. The time diversity communication system of claim 14, wherein the first fragment and the remaining fragments of the message are received up to four times by the selective call receiver.

19. A method of parsing a message into fragments in a messaging system, comprising the steps of:

defining a number of bits per character in a message within a fragment;

filling the fragment with complete characters if the number of bits per character is a sub-multiple of a predefined size of a message word within the fragment;

filling a remaining portion of the fragment with default bits when the fragment does not end with a complete character when the number of bits per character is not a sub-multiple of the predefined size of the message word; and starting a subsequent fragment with a next character starting in a known position.

20. The method of parsing messages in accordance with claim 19, wherein the method is for a time diversity messaging system.

21. The method of claim 19, wherein the fragment always starts on a complete character boundary.

22. The method of claim 19, wherein the method further includes the step of choosing a final fragment length such that at least one default bit is included.

23. The method of claim 19, wherein the method further includes the step defining default bits to be of the opposite value of the last valid character bit.

24. A method of parsing a message into fragments in a messaging system, comprising the steps of:

defining a number of bits per character in a message within a fragment;

filling the fragment with complete characters and partial characters;

determining the number of partial character bits at the end of a fragment to find a first character boundary in a subsequent fragment; and creating a control field to indicate the character boundary in the subsequent fragment.

25. The method of parsing messages in accordance with claim 24, wherein the method is for a time diversity messaging system.

* * * * *